Patented Dec. 22, 1953

2,663,740

UNITED STATES PATENT OFFICE 2,663,740

OXIDATION OF AROMATIC HYDROCARBONS

George M. Calhoun, Evanston, Ill., and John E. Reese, St. Simons Island, Ga., assignors to Hercules Powder Company, Wilmington, Del., a corporation of Delaware No Drawing. Application March 5, 1952, Serial No. 275,012

17 Claims. (Cl. 260—610)

This invention relates to a process for oxidizing an alkyl-substituted aromatic organic compound having the structural formula

in which $R_1$ and $R_2$ represent alkyl groups and Ar represents either an aryl group or an alkaryl group. More particularly, the invention relates to a process for the oxidation of such compounds as cumene in the liquid phase by means of molecular oxygen wherein the reaction is effected at elevated temperatures under superatmospheric pressure in the presence of liquid water or aqueous alkali.

It is known that cumene, for example, may be oxidized in the liquid phase by means of molecular oxygen but none of the processes heretofore disclosed for the oxidation of cumene have resulted in substantial yields of $\alpha,\alpha$-dimethylbenzyl hydroperoxide. Under the conditions practiced in prior procedures, $\alpha,\alpha$-dimethylbenzyl hydroperoxide has not been obtained by the oxidation of cumene. The oxidation has, instead, led to mixtures containing predominant amounts of acetophenone and small amounts of $\alpha,\alpha$-dimethylbenzyl alcohol.

Now, in accordance with this invention, it has been discovered that tertiary hydroperoxides having the structural formula

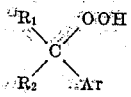

may be prepared by passing an oxygen-containing gas through an alkyl-substituted aromatic organic compound having the structural formula previously described, in the liquid phase, at temperatures between 100° and 130° C. under superatmospheric pressure, in the presence of liquid water or aqueous alkali, the ratio of liquid water or aqueous alkali to the alkyl-substituted aromatic organic compound being from 1:50 to 1:3, preferably from 1:10 to 1:3, by volume. In the structural formula of the hydroperoxides, $R_1$ and $R_2$ represent alkyl groups which may be either the same or different, and Ar represents a substituent selected from the group consisting of aryl and alkaryl groups. These tertiary hydroperoxides may be referred to as $\alpha,\alpha$-dialkylarylmethyl hydroperoxides, or, if desired, as aryl(dialkyl)methyl hydroperoxides. Thus, the hydroperoxide derived from cumene in accordance with the process of this invention may be named $\alpha,\alpha$-dimethylbenzyl hydroperoxide or, if desired, phenyl(dimethyl)methyl hydroperoxide.

The process of this invention may be practiced, for example, by vigorously agitating a mixture composed of three volumes of cumene and one volume of liquid water or aqueous alkali in a closed system at a temperature of about 120° C. and under superatmospheric pressure while simultaneously passing a stream of an oxygen-containing gas through the reaction mixture. The reaction is continued until standard analytical data, such as the refractive index, indicate the conversion of from about 10% to about 70% of the original cumene to oxygenated products. The reaction mixture may then be treated in accordance with known techniques to recover a product containing preponderant amounts of $\alpha,\alpha$-dimethylbenzyl hydroperoxide.

Having thus described the invention, the following examples are offered as specific embodiments thereof. The cumene utilized in carrying out the oxidation reactions upon which the examples are based was a commercial product of 95% purity, which was characterized by a refractive index at 20° C. of 1.4914. All parts are by weight unless otherwise indicated.

EXAMPLE 1

A nickel autoclave equipped with a reflux condenser and a stirrer (200 R. P. M.) and designed for high pressure oxidations was charged with 3950 parts of cumene and 1090 parts of 7% aqueous sodium hydroxide. One hundred sixty-four parts of oxidized cumene containing 72.4% of $\alpha,\alpha$-dimethylbenzyl hydroperoxide was added to the charge as a reaction initiator. Oxygen was passed through the reaction mixture at the rate of 0.035 cu. ft./min./kg. of cumene for four hours. A temperature of 120° C. and a pressure of 60 lb./sq. in. were maintained within the autoclave throughout the reaction period. By this means was obtained 4320 parts of an oxygenated material representing the conversion of 42.4% of the original cumene. Analysis of this crude product indicated that 30.5% of the cumene had been converted to $\alpha,\alpha$-dimethylbenzyl hydroperoxide, 7% to $\alpha,\alpha$-dimethylbenzyl alcohol, and 4.9% to acetophenone and other secondary reaction products. The amount of $\alpha,\alpha$-dimethylbenzyl hydroperoxide was determined by adding a sample of the oxidized product to acidified potassium iodide and noting the amount of free iodine liberated. The $\alpha,\alpha$-dimethylbenzyl alcohol content was determined by infrared analysis and the acetophenone content by ultraviolet analysis.

EXAMPLE 2

The same equipment and the same conditions of temperature and pressure as those described in Example 1 were again utilized. In this case, however, p-cymene was oxidized using an oxygen input of 0.034 cu. ft./min./kg. of p-cymene, and the reaction was continued for two hours. Thus, the autoclave was charged with 2904 parts of p-cymene ($n_D^{20}=1.4911$, bromine number=0) and 1250 parts of 1% aqueous sodium hydroxide solution. Nine hundred fifty-nine parts of p-cymene which had been previously oxidized and which contained 11.8% of $\alpha,\alpha$-dimethyl-p-methylbenzyl hydroperoxide was added to the charge as a reaction initiator. By this means, 27.6% of the original cymene was converted to oxygenated materials. Of this oxygenated product 84% (or 23.1% of the original p-cymene) was found to be $\alpha,\alpha$-dimethyl-p-methylbenzyl hydroperoxide.

EXAMPLE 3

The same equipment and the same reaction temperature as that described in Example 1 were again utilized. In this case, however, p-diisopropylbenzene was oxidized and the oxidation was carried out under a pressure of 100 p. s. i. Thus, the autoclave was charged with 3750 parts of p-diisopropylbenzene and 1250 parts of 2% aqueous sodium hydroxide. One hundred thirteen parts of $\alpha,\alpha$-dimethyl-p-isopropylbenzyl hydroperoxide was added to the charge as a reaction initiator. The oxidation of the p-diisopropylbenzene was then effected by passing oxygen through the reaction mixture at the rate of 0.027 cu. ft./min./kg. of p-diisopropylbenzene. By this means 23% of the p-diisopropylbenzene was converted to oxygenated materials. By analysis, it was determined that 22% of the p-diisopropylbenzene had been converted to a product consisting predominantly of $\alpha,\alpha$-dimethyl-p-isopropylbenzyl hydroperoxide in admixture with some $\alpha,\alpha,\alpha',\alpha'$-tetramethyl-p-xylylene dihydroperoxide.

EXAMPLE 4

A stainless steel autoclave was charged with 2990 parts of cumene, 784 parts of water and 111 parts of 50% sodium hydroxide. Three hundred eight parts of oxidized cumene containing 33.0% of $\alpha,\alpha$-dimethylbenzyl hydroperoxide was added to the charge as a reaction initiator. The oxidation was effected by passing compressed air through the reaction mixture. The gas exit valve on the autoclave was so adjusted that an air exit rate of about 321 liters/hr./kg. of cumene resulted throughout the reaction. During the course of the reaction, the temperature and pressure within the autoclave were maintained at 120° C. and 200 p. s. i., respectively. The progress of the reaction was followed by determining the refractive index of the reaction mixture periodically. Analysis of the reaction product after 2.5 hours of reaction indicated that 29.3% of the original cumene had been converted to $\alpha,\alpha$-dimethylbenzyl hydroperoxide while 4.9% had been converted to $\alpha,\alpha$-dimethylbenzyl alcohol, acetophenone, and other secondary reaction products. Thus, a total conversion of 34.2% of the original cumene was obtained.

EXAMPLE 5

A stainless steel autoclave equipped with a reflux condenser and a high speed stirrer and designed for high pressure oxidations was charged with 108 parts of cumene and 32 parts of a 1% aqueous sodium bicarbonate solution. Eleven parts of oxidized cumene containing 35.0% of $\alpha,\alpha$-dimethylbenzyl hydroperoxide was added to the charge as a reaction initiator. Air was passed through the reaction mixture at the rate of 308.4 liters per hour per kilogram of cumene. A temperature of 118° C. and a pressure of 60 p.s.i. were maintained within the autoclave throughout the reaction period. The oxidation was begun as a batch operation and allowed to continue for one hour, after which cumene and 1% aqueous sodium bicarbonate were pumped into the autoclave at a ratio of 4.6 volumes of cumene per volume of 1% sodium bicarbonate. The oxidation was then continued on a continuous reaction basis for several hours beyond the equilibrium point. The data of Table 1 show the progress of the reaction.

Table 1

| Time (hrs.) | Cumene input (part/ hr.) | 1% NaHCO$_3$ input (part/ hr.) | Sp. gr., 15.6/15.6 | $n_D^{20}$ | Percent Hydroperoxide | Percent total conversion |
|---|---|---|---|---|---|---|
| 0 | | | 0.8822 | 1.4933 | 8.4 | |
| 1 | 114.5 | 24.94 | .8781 | 1.4920 | 6.5 | 8.4 |
| 2 | 112 | 25.50 | .8736 | 1.4918 | 4.6 | 5.5 |
| 3 | 113 | 26.37 | .8723 | 1.4913 | 4.7 | 4.9 |
| 4 | 113.5 | 27.37 | .8720 | 1.4926 | 4.0 | 4.4 |
| 5 | 116.5 | 28.25 | .8718 | 1.4912 | 3.9 | 4.3 |
| 6 | 112 | 28.12 | .8733 | 1.4914 | 4.8 | 5.3 |
| 7 | 115 | 27.12 | .8725 | 1.4919 | 4.6 | 4.7 |
| 8 | 114 | 29.75 | .8725 | 1.4917 | 4.2 | 4.7 |

During the reaction the pH of the aqueous phase ranged from 9.4 to 9.6. The yield of hydroperoxide taken over a five-hour equilibrium period was 96%. The amount of $\alpha,\alpha$-dimethylbenzyl hydroperoxide was determined by adding a sample of the oxidized product to acidified potassium iodide and noting the amount of free iodine liberated.

EXAMPLE 6

The procedure of Example 5 was duplicated except for using a temperature of 105° C. and operating batchwise rather than continuously. After four hours of operation, 21.7% of the cumene was converted to oxygenated products, and 84.3% of the latter was $\alpha,\alpha$-dimethylbenzyl hydroperoxide. At the end of eight hours there was 45.1% total oxygenated products, of which 83.5% was $\alpha,\alpha$-dimethylbenzyl hydroperoxide. Based on the original cumene, the amount of hydroperoxide was 37.7%.

This run was substantially duplicated using 108 parts of cumene, 32 parts of 1% aqueous sodium bicarbonate solution, 11 parts of oxidized cumene containing 30% $\alpha,\alpha$-dimethylbenzyl hydroperoxide as initiator, a temperature of 110° C., and a pressure of 100 p. s. i. g. After three hours of oxidation, the product contained 28.6% oxidation products. The amount of $\alpha,\alpha$-dimethylbenzyl hydroperoxide was 24.9%, based on the original cumene. The hydroperoxide yield was 87%.

EXAMPLE 7

Three thousand eight hundred and eighty parts of cumene and 1120 parts of 0.315% aqueous sodium carbonate solution were charged to a pressure oxidizer. The volume ratio of aqueous sodium carbonate to cumene was 1:4. The reaction was initiated with 19.5 parts of $\alpha,\alpha$-dimethylbenzyl hydroperoxide of 99.5% purity. The oxidation was carried out at 100° C. and 80 p. s. i. g. pressure by passing air through the reaction mixture at a rate which supplied a 100% excess of air. At the end of 10 hours of oxidation, the reaction mixture contained 17.2% total oxygenated products, the amount of α,α-dimethylbenzyl hydroperoxide was 16.2%. The hydroperoxide yield was thus 93.2%. After 15.5 hours the corresponding values were 30.5%, 28.1% and 91.5%.

The above run was modified to the extent of using aqueous 2.5% sodium bicarbonate, a temperature of 130° C., a pressure of 150 p. s. i. g., and an air rate of 0.296 cu. ft./min./kg. of cumene. Also, the initiator was 119 parts of 98% pure α,α-dimethylbenzyl hydroperoxide. After 0.5 hours of oxidation, the reaction mixture contained 13.2% α,α-dimethylbenzyl hydroperoxide, the yield of hydroperoxide in relation to total oxygenated products being 96%. After one hour the hydroperoxide content was 30.2%.

EXAMPLE 8

A pressure oxidizer was charged with 344 parts of cumene, 40 parts of aqueous 0.5% sodium hydroxide solution and 12.2 parts of 98% pure α,α-dimethylbenzyl hydroperoxide. The volume ratio of aqueous sodium hydroxide to cumene was 1:10. Oxygen was passed through the reaction mixture at a rate of 17.4 liters/hr./kg. of cumene. The temperature was maintained at 100° C. and the pressure at 30 p. s. i. After oxidizing for 20.2 hours, α,α-dimethylbenzyl hydroperoxide was the sole oxygenated product present, it being present to the extent of 23.9%. At the end of 47.2 hours, the reaction product contained 52.7% total oxygenated products, and the hydroperoxide content was 49.2%. The hydroperoxide yield based on total oxygenated products was 93%.

The examples have set forth the use of cumene, p-cymene and p-diisopropylbenzene as compounds which may be treated in accordance with the process of this invention. Other compounds, however, having the structural formula previously set forth may be utilized. The primary requirement for compounds which may be oxidized in accordance with this invention is the presence of a tertiary carbon atom, the fourth valence bond of which is satisfied by a hydrogen atom. As indicated by the structural formula, the carbon atom is tertiary because it is directly connected to three other carbon atoms, one of which is contained in each of the groups represented by $R_1$ and $R_2$ and Ar.

The aryl or alkaryl group need not be derived from benzene as in the case of cumene, p-cymene and p-diisopropylbenzene. Other compounds containing aromatic nuclei, such as those derived from naphthalene, anthracene, and phenanthrene, which otherwise meet the requirements of the structural formula, are also operable. However, such compounds, if solids, must be dissolved in a suitable solvent such as benzene during the liquid phase oxidation reaction. Furthermore, the aryl group may be substituted with alkyl groups such as methyl, ethyl, propyl, isopropyl, butyl, isobutyl, sec-butyl, tert-butyl, and the like. The alkyl groups represented by $R_1$ and $R_2$ in the structural formula need not be limited to methyl groups as in the case of cumene, p-cymene and p-diisopropylbenzene. Other alkyl groups such as those indicated as suitable substituents for the aryl groups may be utilized. Furthermore, $R_1$ and $R_2$ may be either the same or different.

As previously mentioned, the process of this invention entails the joint utilization of superatmospheric pressure, temperatures between 100° C. and 130° C., and a ratio of liquid water or aqueous alkali to alkyl-substituted aromatic organic compound of between 1:50 and 1:3, preferably between 1:10 and 1:3, by volume. By this means there is obtained a high yield of the desired hydroperoxides after a relatively short period of oxidation. Furthermore, the formation of undesirable secondary reaction products is curtailed. A particularly applicable temperature range is from about 115° C. to about 120° C.

The pressures which are operable in conjunction with the above-defined temperature ranges are limited only by equipment design. From a practical standpoint, pressures of from about 30 p. s. i. to about 500 p. s. i. are feasible. The preferred pressure range, however, is from about 60 p. s. i. to about 200 p. s. i. In any particular instance, the temperature and pressure may readily be adjusted to obtain an optimum result.

The ratio of the quantity of aqueous medium present in the reaction mixture to the amount of compound subjected to oxidation is between 1:50 and 1:3, preferably between 1:10 and 1:3, by volume. The optimum ratio is about 1:4 by volume. Within the described ranges of 1:50 to 1:3 and 1:10 to 1:3 the alkyl-substituted aromatic organic compound being oxidized constitutes the continuous phase during the oxidation reaction, and the aqueous medium is the dispersed phase. These conditions make it possible to produce hydroperoxides in higher yields than are obtainable when the aqueous phase is continuous, for example, when the volume ratio of aqueous medium to the compound being oxidized is about 2:1. The 1:3 limit of the prescribed volume ratio ranges insures that the compound being oxidized will be in the continuous phase. At this limit the amount of aqueous medium constitutes 25% of the total liquid phase, and the compound being oxidized constitutes 75%.

The yield of hydroperoxide may customarily be increased by the utilization of aqueous alkali as the liquid medium present in the reaction mixture. Suitable aqueous alkali solutions may be formulated from alkali metal hydroxides, such as the hydroxides of sodium, potassium, lithium, and the like. Likewise, alkaline earth metal hydroxides, such as calcium or barium hydroxide, may be utilized. Inorganic carbonates and bicarbonates, such as sodium carbonate and bicarbonate, and alkali metal salts of weak organic acids may also be employed. Strong organic bases, such as tetraalkyl or trialkylaralkyl ammonium hydroxides, for example, trimethylbenzylammonium hydroxide, may also be used. The concentration of alkaline solution which it is most desirable to utilize will depend upon the particular alkali used and may vary within wide limits. For example, sodium hydroxide, sodium bicarbonate, and sodium carbonate may be employed in solutions containing from about 1% to about 15% by weight of the alkali. It is preferable, however, to use solutions containing from about 2% to about 8% by weight of the alkali.

When the preferred concentrations of alkali are employed, the preferred ratio of the aqueous alkali to the compound to be oxidized varies from 1:10 to 1:3. If low ratios of aqueous alkali to the compound being oxidized are combined with low alkali concentrations, the total available alkali is lower. Inasmuch as the oxidation of many of the compounds here under consideration such as, for example, p-cymene may result in the formation of organic acids, the alkali present may be completely neutralized. It is, therefore, necessary in the oxidation of such compounds frequently to determine the alkalinity of the aqueous medium and to introduce free alkali, preferably in a more concentrated form, for the purpose of maintaining the alkali concentration at a substantially constant value.

The examples have illustrated the use of air and molecular oxygen as the oxygen-containing gas which may be utilized in accordance with the process of this invention. The oxygen, however, may be furnished in the form of mixtures of molecular oxygen with nitrogen or other inert gases. Oxygen, when used alone, may be either a commercial or chemically pure product. Air may be utilized either as it is readily avilable or after partial or complete humidification. It is advisable to wash the air utilized with a caustic solution to remove carbon dioxide. The rate of input of the oxygen-containing gas may vary within a wide range, depending upon the concentration of oxygen in the gases, the pressure at which the oxidation is carried out and the efficiency of dispersion. At pressures of from 50 to 200 p. s. i., for example, the rate of input may be from about 2 to about 200 liters of oxygen/hr./kg. of alkaryl compound. A preferable range is from about 20 to about 60 liters of oxygen/hr./kg.

The crude oxidation product obtained in accordance with the process of this invention, which contains appreciable amounts of hydroperoxide, is useful as an initiator for the oxidation reaction by which the hydroperoxides are formed. This reaction product, however, does not act as an actual catalyst and is, therefore, highly desirable as an initiator for those oxidations from which it is desired to obtain optimum yields of hydroperoxides. When it is desired to speed up the oxidation reaction, these hydroperoxide-rich oils may be used in an amount up to about 50% by weight of the compound to be oxidized. A preferred range is from about 3% to about 20%. It is not essential to the process of this invention, however, that such a reaction initiator be utilized.

Inasmuch as the reaction mixture is heterogeneous in nature, suitable agitation is essential. It is particularly important to effect an intimate contact of the oxygen-containing gas with the liquid phase. This may be accomplished by means of high speed stirrers, suitable nozzles, porous plates, and the like, or by combinations of these devices.

The course of the reaction may be followed by determining the refractive index of the oily layer at periodic intervals. With respect to the oxidation of cumene, refractive index values from about 1.4939 to about 1.5116 indicate that from about 10% to about 70% of the original material has been oxidized. The reaction is advisably interrupted within this range of conversion. The refractive indices depend somewhat upon three factors: (1) The nature of the material oxidized, (2) the nature of the aqueous medium employed, i. e., liquid water or aqueous alkali, and (3) the nature of the desired end product. The first of these factors—the compound oxidized—is of less significance than the other two. If aqueous alkali is used as the medium, any acids formed will dissolve therein and the refractive index will be comparatively lower after the same extent of conversion has been effected than when liquid water is utilized. In the latter case, the acids formed dissolve in the oily phase and the refractive index may rise as high as 1.5230. The nature of the desired end product is of particular significance when the compound undergoing oxidation has two tertiary carbon atoms as in the case of diisopropylbenzene. From such a compound there may be prepared either a mono- or a di-hydroperoxide. To obtain the monohydroperoxide, the oxidation is interrupted at a relatively low refractive index, whereas the presence of a substantial amount of a dihydroperoxide is indicated by an appreciably higher refractive index.

Conversion to oxygenated materials of from about 10% to about 70% of the alkyl-substituted aromatic organic compounds previously described may be effected by the process of this invention. It is desirable for the purpose of obtaining a high yield of hydroperoxide to effect conversion of from about 10% to about 30% of the original material inasmuch as undue amounts of secondary reaction products, such as the corresponding alcohol or ketone, are not formed until this degree of conversion is exceeded.

The method utilized in recovery of the reaction products will vary, depending upon the use to which the hydroperoxide is to be put. If the use of the hydroperoxide does not require separation of the hydroperoxide from other components, such as alcohols, ketones, and unreacted starting material which may be present in the crude reaction mixture, the oily reaction product may be washed with dilute aqueous alkali and used either in the wet, slightly cloudy state for various purposes or after clarification and drying by filtration. The dilute aqueous alkali used in the washing step may be sodium hydroxide, sodium carbonate, sodium bicarbonate, and the like, the concentration of these alkalies in aqueous solution ranging from about 1% to about 10%, but preferably from about 2% to about 5%. If it is desired, however, to obtain a highly concentrated hydroperoxide, the crude reaction product, after the alkali wash, may be stripped of unreacted hydrocarbon by distillation at pressures of about 1 to about 10 millimeters of mercury. The hydroperoxides themselves may be safely distilled at temperatures below about 100° C., this requiring the use, however, of pressures of about 0.01 to about 1.0 millimeter. $\alpha,\alpha$-Dimethylbenzyl hydroperoxide, for example, may be distilled at 60° C. under a pressure of 0.2 millimeter and at 68° C. under a pressure of 0.3 millimeter. Another method of separating the hydroperoxides from the crude oily reaction product involves precipitation of the hydroperoxide with a concentrated aqueous solution (25% to 40%) of sodium hydroxide. The precipitate is crystalline. The precipitate of $\alpha,\alpha$-dimethylbenzyl hydroperoxide, for example, analyzes for the sodium salt of the hydroperoxide associated with four molecules of water.

The oxidation according to this invention apparently proceeds by a free radical chain mechanism. Using cumene as an example, when this compound is oxidized with molecular oxygen, a hydroperoxide is first formed on the tertiary carbon of the isopropyl group. A very small fraction of this hydroperoxide is then decomposed, resulting in the formation of free radicals which are sufficient to initiate the formation of more hydroperoxide molecules. That the oxidation follows a chain mechanism is shown by the existence of an induction period, by cases of inhibition, and by the fact that both may be eliminated by the addition of hydroperoxide-rich oils from a previous oxidation run.

The process of this invention is advantageous in that it has been found possible by utilization of elevated temperatures and superatmospheric pressure to obtain α,α-dialkylarylmethyl hydroperoxides in high yields, in a relatively short time, and without the formation of substantial amounts of secondary reaction products. These hydroperoxides are highly useful and find various commerical applications. They are excellent catalysts for the polymerization of vinyl, vinylidene, and vinylene compounds, being, for example, highly useful in the copolymerization of butadiene and styrene to form synthetic rubber, and they also are useful in rubber reclaiming, in flotation, and in kier boiling, bleaching, and other textile operations.

This application constitutes a continuation-in-part of our application for United States Letters Patent, Serial No. 59,764, filed November 12, 1948 and now abandoned.

What we claim and desire to protect by Letters Patent is:

1. The process of oxidizing an alkyl-substituted aromatic organic compound to a tertiary organic hydroperoxide which comprises passing, with intimate contact, an oxygen-containing gas through the aromatic organic compound, in the liquid phase, at a temperature between 100° C. and 130° C. under a pressure of from about 30 p. s. i. to about 500 p. s. i., in the presence of an aqueous medium selected from the group consisting of liquid water and aqueous alkali, the ratio of the aqueous medium to the aromatic organic compound being between 1:50 and 1:3 by volume, and the aromatic organic compound and the tertiary organic hydroperoxide having, respectively, the structural formulae

and

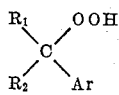

in which R₁ and R₂ represent alkyl groups and Ar represents a substituent selected from the group consisting of the aryl and alkaryl groups.

2. The process of claim 1 wherein the aqueous medium is aqueous alkali.

3. The process of claim 2 wherein the aqueous alkali is aqueous sodium carbonate.

4. The process of claim 3 wherein the alkyl-substituted aromatic organic compound oxidized is cumene and the tertiary organic hydroperoxide produced is α,α-dimethylbenzyl hydroperoxide.

5. The process of claim 3 wherein the alkyl-substituted aromatic organic compound oxidized is p-cymene and the tertiary organic hydroperoxide produced is α,α-dimethyl-p-methylbenzyl hydroperoxide.

6. The process of claim 3 wherein the alkyl-substituted aromatic organic compound oxidized is p-diisopropylbenzene and the tertiary organic hydroperoxide produced is selected from the group consisting of α,α-dimethyl-p-isopropylbenzyl hydroperoxide and α,α,α',α'-tetramethyl-p-xylylene dihydroperoxide.

7. The process of oxidizing an alkyl-substituted aromatic organic compound to a tertiary organic hydroperoxide which comprises passing, with intimate contact, an oxygen-containing gas through the aromatic organic compound, in the liquid phase, at a temperature between about 115° C. and about 120° C. under a pressure of from about 60 p. s. i. to about 200 p. s. i., in the presence of an aqueous medium selected from the group consisting of liquid water and aqueous alkali, the ratio of the aqueous medium to the aromatic organic compound being between 1:10 and 1:3 by volume, and the aromatic organic compound and the tertiary organic hydroperoxide having, respectively, the structural formulae

and

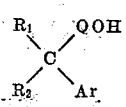

in which R₁ and R₂ represent alkyl groups and Ar represents a substituent selected from the group consisting of the aryl and alkaryl groups.

8. The process of claim 7 wherein the aqueous medium is aqueous alkali.

9. The process of claim 8 wherein the aqueous alkali is aqueous sodium carbonate.

10. The process of claim 9 wherein the alkyl-substituted aromatic organic compound oxidized is cumene and the tertiary organic hydroperoxide produced is α,α-dimethylbenzyl hydroperoxide.

11. The process of claim 9 wherein the alkyl-substituted aromatic organic compound oxidized is p-cymene and the tertiary organic hydroperoxide produced is α,α-dimethyl-p-methylbenzyl hydroperoxide.

12. The process of claim 9 wherein the alkyl-substituted aromatic organic compound oxidized is p-diisopropylbenzene and the tertiary organic hydroperoxide produced is selected from the group consisting of α,α-dimethyl-p-isopropylbenzyl hydroperoxide and α,α,α',α'-tetramethyl-p-xylylene dihydroperoxide.

13. The process of oxidizing an alkyl-substituted aromatic organic compound to a tertiary organic hydroperoxide which comprises passing, with intimate contact, an oxygen-containing gas through the aromatic organic compound, in the liquid phase, at a temperature between 100° C. and 130° C. under a pressure of from about 30 p. s. i. to about 500 p. s. i. in the presence of an aqueous medium selected from the group consisting of liquid water and aqueous alkali, the ratio of the aqueous medium to the aromatic organic compound being between 1:50 and 1:3 by volume, and the aromatic organic compound and the tertiary organic hydroperoxide having, respectively, the structural formulae $$\begin{array}{c} R_1 \diagdown \diagup H \\ C \\ R_2 \diagup \diagdown Ar \end{array}$$

and $$\begin{array}{c} R_1 \diagdown \diagup OOH \\ C \\ R_2 \diagup \diagdown Ar \end{array}$$

in which R₁ and R₂ represent alkyl groups and Ar represents an aryl group.

14. The process of claim 13 wherein the aryl group is a phenyl group.

15. The process of claim 13 wherein the aryl group is a naphthyl group.

16. The process of oxidizing an alkyl-substituted aromatic organic compound to a tertiary organic hydroperoxide which comprises passing, with intimate contact, an oxygen-containing gas through the aromatic organic compound, in the liquid phase, at a temperature between 100° C. and 130° C. under a pressure of from about 30 p. s. i. to about 500 p. s. i. in the presence of an aqueous medium selected from the group consisting of liquid water and aqueous alkali, the ratio of the aqueous medium to the aromatic organic compound being between 1:50 and 1:3 by volume, and the aromatic organic compound and the tertiary organic hydroperoxide having, respectively, the structural formulae

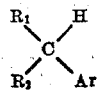

and

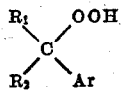

in which $R_1$ and $R_2$ represent alkyl groups and Ar represents an alkaryl group.

17. The process of claim 16 wherein the alkaryl group is an isopropylphenyl group.

GEORGE M. CALHOUN.
JOHN E. REESE.

References Cited in the file of this patent

UNITED STATES PATENTS

| Number | Name | Date |
| --- | --- | --- |
| 2,548,435 | Lorand et al. | Apr. 10, 1951 |

FOREIGN PATENTS

| Number | Country | Date |
| --- | --- | --- |
| 610,293 | Great Britain | Oct. 13, 1948 |

OTHER REFERENCES

Babor et al., General College Chemistry, 2nd edition (1940), pages 80 and 81.